Sept. 27, 1955     C. J. MALM ET AL     2,718,667
METHOD OF PREPARING ENTERIC CAPSULES
Filed May 1, 1952
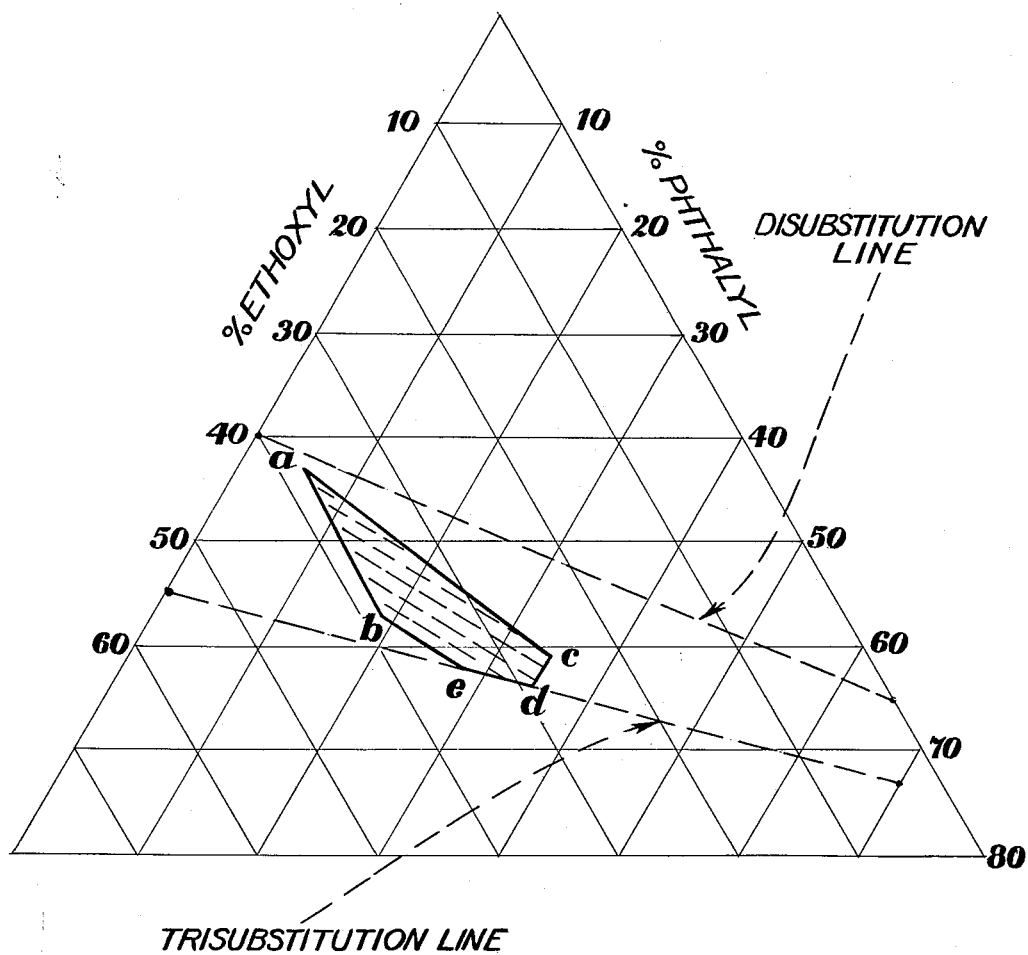
Carl J. Malm
Gordon D. Hiatt
INVENTORS
BY
ATTORNEYS

United States Patent Office 2,718,667
Patented Sept. 27, 1955

2,718,667

METHOD OF PREPARING ENTERIC CAPSULES

Carl J. Malm and Gordon D. Hiatt, Rochester, N. Y., assignors to Eastman Kodak Company, Rochester, N. Y., a corporation of New Jersey Application May 1, 1952, Serial No. 285,573

4 Claims. (Cl. 18—58.5)

This invention relates to a method of making medicinal capsules and to the capsules resulting therefrom.

In times past capsules have been made almost universally from gelatin; however, in the case of medicaments which are to be applied enterically, gelatin has been unsatisfactory due to the fact that it disintegrates in the stomach and thereby releases the medicament at that point.

As was pointed out in U. S. Patent No. 2,196,768 of Hiatt, a medicament may be surrounded by a coating of cellulose acetate phthalate and the resulting product is characterized by enteric properties so that the desired medication is obtained thereby. Other materials than gelatin have been suggested for use in the preparation of capsules, but in many cases the material used has been so resistant to disintegration by internal secretions that often the releasing of the medicament anywhere in the body has not been accomplished.

One object of our invention is to provide enteric capsules in which the use of gelatin in their preparation is unnecessary. Another object of our invention is to provide a method of making enteric capsules by means of a cellulose derivative having enteric properties, which derivative in aqueous solution sets upon the application of heat. A further object of our invention is to prepare cellulose ether phthalate capsules. Other objects of our invention will appear herein.

We have discovered that cellulose derivatives which contain both ethoxyl and phthalyl groups can be readily employed in forming enteric capsules by subjecting a water solution of alkali salts thereof to a series of steps involving forming the capsules under cool conditions and then applying heat thereto to set the same.

The appended drawing consists of a triangular graph indicating the cellulose derivatives which are useful in accordance with our invention. The ethyl cellulose phthalates which are adapted for use in our invention, as will be described herein, are contained within the shaded area of the graph. In the attached graph, by extending lines c—a and e—b to the per cent ethoxyl line, the range of the ethoxyl contents of the cellulose ethers which are employed as the starting material in preparing the cellulose ether phthalates is obtained. Thus, in the darkened area, the ethoxyl contents of the cellulose ethers from which the cellulose ether phthalates are prepared range from 40 to 47%. The ethoxyl contents of the cellulose ether phthalates are designated by the lines proceeding diagonally downward from the per cent ethoxyl designations, and it may, therefore, be seen that the shaded area in the drawing ranges from 26 to 38% ethoxyl content for the cellulose ether phthalates which are useful. The phthalyl contents of those compounds, as may be determined from the graph, range from 6 to 35%. The ethyl cellulose phthalates which have been found to be most useful in our invention are those whose alkali (or ammonium) salts are soluble in water or dilute alkali at 50–70° F. Some ethyl cellulose phthalates which are particularly useful for preparing enteric capsules in accordance with our invention have the following ethoxy and phthalyl contents, the ethoxy being in terms of the total compound:

| Ethoxy (Percent) | Phthalyl (Percent) |
|---|---|
| 32 | 30 |
| 34 | 25 |
| 35 | 20 |
| 36.5 | 20 |
| 38 | 15 |
| 27 | 34 |
| 33 | 28 |

Capsules are prepared in accordance with our invention by dipping a capsule-forming element, such as a polished steel mandrel, into an aqueous solution of an alkali salt of the cellulose ethyl phthalate followed by setting the same by means of an elevated temperature and then removing the half capsule from the capsule-forming element. The ethyl cellulose phthalate solution employed is prepared by dissolving the ether ester with cooling, in a dilute aqueous solution of alkali, such as dilute ammonia water or dilute sodium hydroxide or sodium carbonate whereby a smooth solution is obtained. Ordinarily, a temperature less than room temperature, such as not more than 70° F., may be employed in this dissolving operation. It is desirable that the solution of the cellulose ether phthalate be of sufficient concentration that the walls of the capsule formed therefrom are of sufficient thickness to retain their form upon handling. Thus, the solutions may be of a concentration of 5–20%, but if a thin-walled capsule is desired, concentrations of less than 5% may be used. The formed capsule is set by means of an elevated temperature. This setting is most rapidly accomplished by dipping the capsule as formed into water having an elevated temperature such as greater than 120° F. (and less than boiling). After the capsule has been formed and set, it may then be conveniently dried by subjecting to treatment with warm air. The thus-formed capsule may then be employed for preparing medicinal units by incorporating therein a drug such as aspirin, pancreatin, bile salts, gentian violet, ferrous sulfate, barium sulfate, etc., and putting the two halves of the capsule together.

If a semi-rigid capsule is desired, a plasticizer for the cellulose derivative can also be incorporated in the capsule-forming liquid in small proportion. Some materials which may be employed in this connection are glycerine, ethylene glycol, glycerol monomethyl ether, triacetin or the like. Ordinarily it is preferable to use not more than 5% of the plasticizer, based on the weight of the dried capsule.

The following example illustrates our invention:

Example

Ethyl cellulose phthalate having a phthalyl content of 23% and an ethoxyl content of approximately 35%, which ester was prepared from ethyl cellulose analyzing 46% ethoxyl, was dissolved in cold dilute ammonia water. After the solution stood for a sufficient time to free it of bubbles, the temperature was adjusted to 50° F., thereby giving a good fluid solution having 10% of the ethyl cellulose phthalate therein. A cold mandrel was dipped into this solution withdrawn, rotated to give an even coating, and then dipped into water having a temperature of 140° F. This hot water set the coating at once. The mandrel was then passed through a chamber where warm air was circulated, whereby the coating dried. Ammonia was given off and a cured half capsule of ethyl cellulose phthalate was obtained. The product thus obtained was unaffected by acid gastric conditions, but disintegrated when in alkaline intestinal fluids at body temperature, which action would allow the release of medicaments enclosed in a capsule of the material specified.

As an alternative method of operation, the medicament and capsulating material may be co-extruded to form a globule of medicament surrounded by ethyl cellulose phthalate, this operation occurring at a low temperature. The globule thus formed is allowed to fall into warm water which sets the composition. The gelled sphere thus obtained is then dried by subjecting to a current of warm air on a vibrating table. In the drying operation it is desirable that the relative humidity of the air at the drying temperature should be of at least 40% in order to avoid undue brittleness in the coating unless plasticizer had been incorporated in the coating composition.

We claim:

1. A method of preparing enteric capsule shells which comprises dipping at a temperature of not more than 70° F. capsule-forming elements into an aqueous solution of an ammonium salt of a cellulose ether phthalate having an ethoxyl content of 26–38% and a phthalyl content of 6–35%, the aqueous solution of which salt coagulates at a temperature of at least 120° F., to form skins on the capsule-forming elements, gelling the thus formed skins by heating to a temperature of at least 120° F. and subsequently drying the shells formed thereby.

2. A method of preparing enteric capsule shells which comprises dipping at a temperature of not more than 70° F. capsule forming elements into an aqueous solution of an ammonium salt of a cellulose ether phthalate having an ethoxyl content of 26–38% and a phthalyl content of 6–35%, the aqueous solution of which salt coagulates at a temperature of at least 120° F., to form skins on the capsule forming elements, gelling the thus formed skins by immersing in water having a temperature of at least 120° F. and subsequently drying the shells formed thereby.

3. A method of preparing enteric capsule shells which comprises dipping at a temperature of not more than 70° F. capsule forming elements into an aqueous solution of an ammonium salt of a cellulose ether phthalate having an ethoxyl content of 26–38% and a phthalyl content of 6–35%, the aqueous solution of which salt coagulates at a temperature of at least 120° F., to form skins on the capsule forming elements, gelling the thus formed skins by immersing in water having a temperature of at least 120° F. and drying the skins in a current of warm air having a relative humidity of at least 40%.

4. A method of preparing enteric capsule shells which comprises dipping at a temperature of not more than 70° F. capsule forming elements into an aqueous solution of an ammonium salt of ethyl cellulose phthalate having an ethoxyl content of approximately 35% and a phthalyl content of approximately 23% to form skins on the capsule forming elements, gelling the thus formed skins by immersing in water having a temperature of at least 120° F. and drying the skins in a current of warm air having a relative humidity of at least 40%.

References Cited in the file of this patent

UNITED STATES PATENTS

| | | |
|---|---|---|
| 2,196,768 | Hiatt | Apr. 9, 1940 |
| 2,217,734 | Dreyfus | Oct. 15, 1940 |
| 2,231,927 | Lilienfeld | Feb. 18, 1941 |
| 2,575,789 | Bogin | Nov. 20, 1951 |